UNITED STATES PATENT OFFICE 1,946,951

AZO - DYESTUFF CONTAINING CHROMIUM AND PROCESS OF MAKING THE SAME

Fritz Straub and Hermann Schneider, Riehen, near Basel, Switzerland, assignors to the firm Society of Chemical Industry in Basle, Basel, Switzerland No Drawing. Application February 13, 1933, Serial No. 656,621, and in Switzerland February 20, 1932

14 Claims. (Cl. 260—12)

The present invention relates to the manufacture of chromiferous azo-dyestuffs. It comprises the manufacture of these dyestuffs as well as the dyestuffs themselves.

According to the present invention chromiferous azo-dyestuffs are produced by treating in a medium whose pH-value is not greater than 7, azo-dyestuffs of the general formula

wherein $R_1$ means a sulfonated naphthalene radicle, $R_2$ a naphthol radicle, and wherein the hydroxyl group stands in o-position to the azo-bridge, with agents yielding chromium, and then completing the chroming under alkaline reaction without separating the chromiferous intermediate products.

Azo-dyestuffs of the above general formula may be obtained from different diazotized o-hydroxy-aminonaphthalene sulfonic acids by coupling with different naphthols. Diazo compounds of suitable o-hydroxyaminonaphthalene sulfonic acids are for example the diazo compounds of 1-amino-2-hydroxynaphthalene-4-sulfonic acid, 1-hydroxy-2-aminonaphthalene-4-sulfonic acid, 1-amino-2-hydroxynaphthalene-6-sulfonic acid, 1-amino-2-hydroxynaphthalene-6-chloro-4-sulfonic acid, 1-amino-2-hydroxynaphthalene-6-bromo-4-sulfonic acid; further there may also be used as diazo components for example the nitrated 1-diazo-2-hydroxynaphthalene-4-sulfonic acid and the nitrated 1-diazo-2-hydroxynaphthalene-6-sulfonic acid. Suitable coupling components are α- and β-naphthol, as well as their substitution products, such as for example 8-chloro-α-naphthol and 5:8-dichloro-α-naphthol.

The treatment with the agent that yields chromium may occur in an open vessel or under pressure and in presence or absence of additions, such as inorganic or organic alkali salts, inorganic or organic acids, in a neutral or acid medium, that is to say in a medium whose pH-value is not greater than 7.

Also the completion of the chroming under alkaline conditions may be conducted under atmospheric or increased pressure by using soda, potash, ammonium or caustic alkalies, and also in presence or absence of additions, such as for example inorganic and organic alkali salts. Particularly good results are obtained when using caustic alkalies.

As agents yielding chromium there may be used with advantage chromium salts, such as chromium chloride, chromium fluoride, chromium sulfate, chromium sulfite, chromium acetate, chromium formate, chromium oxalate, chromium benzenesulfonate or mixtures of such chroming agents.

Particularly valuable dyestuffs are produced when the azo-dyestuff capable of being chromed is one from diazotized 1-amino-2-hydroxynaphthalene-4-sulfonic acid and a naphthol, for instance β-naphthol; for in this case dyestuffs are obtained which dye marine blue and, in contrast with the hitherto known dyestuffs of this group that dye similar tints, dye uniformly even in deep tints and are fast in every respect.

By this new process it is possible to convert the very cheap blue dye known as chrome Fast Cyanine into cheap and fast chromium compounds which dye marine blue; this was not possible by any method of chroming hitherto known.

The chromium compounds obtainable in accordance with the invention may be dyed with advantage according to the processes of application Serial No. 482,155 and Swiss application No. 93,612 and are characterized by very good solubility in water; they may be used for dyeing materials of any kind such as wool, loaded or non-loaded silk, cotton, leather, artificial silks derived from regenerated cellulose, cellulose esters and ethers, lacquers having a cellulose basis or a natural or an artificial resin basis, or lakes which are to be used as pigments or in printing. They dye very varied tints and the dyeings are very fast.

The following examples illustrate the invention, the parts being by weight:—

Example 1

41.6 parts of the dyestuff from diazotized 1-amino-2-hydroxynaphthalene-4-sulfonic acid and β-naphthol (sodium salt) of the formula

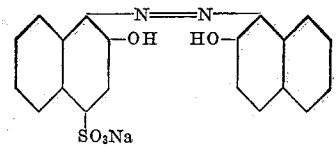

are dissolved in 1000 parts of hot water. 105 parts of chromium fluoride, corresponding with 8 parts of $Cr_2O_3$, and 6.8 parts of sodium formate are added and the whole is boiled for 4–5 hours. After addition of 10 parts of sugar and 100 parts of caustic potash solution (40 per cent. strength) the mass is kept boiling for a further 2 hours, preferably under conditions allowing slow evaporation, and the solution which now amounts to about 800 parts by volume is neutralized with cold hydrochloric acid of 10 per cent. strength and the dyestuff is salted out. After filtering and drying the chromium compound is a blue-black powder which dyes wool in a sulfuric acid bath blue tints of very good properties of fastness.

Example 2

41.6 parts of the dyestuff from diazotized 1-amino-2-hydroxynaphthalene-4-sulfonic acid and β-naphthol (sodium salt) are dissolved in 1000 parts of water and the solution is mixed with 110 parts of basic chromium sulfate $(Cr_2(SO_4)_2(OH)_2)$, corresponding with 8.3 parts of $Cr_2O_3$, and 6.8 parts of sodium formate. The whole is then boiled for 6 hours. After adding 10 parts of sugar and 100 parts of caustic potash solution of 40 per cent. strength the boiling is continued for another 2-3 hours; after filtration, the clear filtrate is neutralized with cold hydrochloric acid of 10 per cent. strength and the dyestuff is salted out. After drying, the chromium compound is an easily soluble blue-black powder which dyes wool in a sulfuric acid bath blue tints of very good fastness.

Example 3

41.6 parts of the dyestuff from diazotized 1-amino-2-hydroxynaphthalene-4-sulfonic acid and β-naphthol are dissolved in 800 parts of boiling water, and the solution is mixed with 58 parts of chromium acetate solution of 14 per cent. strength, corresponding with 8.1 parts of $Cr_2O_3$; the whole is boiled for 2 hours. There are then added 10 parts of sugar and 100 parts of a caustic potash solution of 40 per cent. strength, and the whole is boiled for 2-3 hours. After filtration, there are added to the clear filtrate 200 parts of common salt and the chromium compound is precipitated by neutralizing with hydrochloric acid of 10 per cent. strength. It dissolves in water, dilute sodium carbonate solution and dilute caustic soda solution to blue-violet solutions, and in dilute acetic acid and in concentrated sulfuric acid to blue solutions.

Example 4

41.6 parts of the dyestuff from diazotized 1-amino-2-hydroxynaphthalene-4-sulfonic acid and β-naphthol are dissolved in 800 parts of boiling water. There are added 19.6 parts of chromium formate, corresponding with 8.1 parts of $Cr_2O_3$, and 40.8 parts of crystallized sodium acetate, and the whole is boiled in a reflux apparatus for 6 hours. There are then added 10 parts of sugar and 100 parts of caustic soda solution of 30 per cent. strength and boiling is continued for a further 2 hours. The small quantity of undissolved matter is filtered and after addition of 200 parts of common salt the filtrate is adjusted to neutrality by means of cold hydrochloric acid of 10 per cent. strength, whereby the dyestuff is precipitated. When dry, it is a blue-black powder, freely soluble in water and dyeing wool in a sulfuric acid bath blue tints of excellent fastness.

Example 5

41.6 parts of the dyestuff from diazotized 1-amino-2-hydroxynaphthalene-4-sulfonic acid and β-naphthol are dissolved in 800 parts of boiling water, 19.6 parts of chromium formate (41.3 per cent. strength), corresponding with 8.1 parts of $Cr_2O_3$ are added and the whole is boiled for 4 hours in a reflux apparatus. After addition of 10 parts of sugar the greenish-grey suspension is dissolved by adding 100 parts of caustic potash solution of 40 per cent. strength; the whole is now boiled for a further 2-3 hours. After filtration, the clear filtrate is mixed with 200 parts of common salt and the chromium compound is separated by neutralizing with hydrochloric acid of 10 per cent. strength. When dry, the chromium compound is a blue-black powder, easily soluble in water. It dyes wool in a bath feebly acid with sulfuric acid blue tints which, after development, are excellently fast, and in particular fast to rubbing.

Example 6

41.6 parts of the azo-dyestuff from diazotized 1-amino-2-hydroxynaphthalene-4-sulfonic acid and β-naphthol are dissolved with aid of 13 parts of caustic soda solution of 30 per cent. strength and 10 parts of sugar in 800 parts of water, and the solution is mixed with a chromium solution made from 7.8 parts of $Cr_2O_3$, 14 parts of formic acid (85 per cent. strength) and 3.1 parts of crystallized oxalic acid; the whole is boiled in a reflux apparatus until the parent dyestuff has vanished. There are then added 80 parts of caustic soda solution of 30 per cent. strength and the boiling is continued for a further 2 hours. 4 parts of oxalic acid are then added and the whole is neutralized with hydrochloric acid of 10 per cent. strength. After a short boiling, the liquid is filtered and the filtrate evaporated to dryness in a vacuum. The chromium compound thus obtained dissolves freely in water and in dilute caustic soda solution, the latter solution being a cloudy blue. It dyes wool in an acid bath uniform marine blue tints of pronounced fastness.

Example 7

20.8 parts of the azo-dyestuff from diazotized 1-amino-2-hydroxynaphthalene-4-sulfonic acid and β-naphthol are suspended in 500 parts of water and there are added 6.6 parts of caustic soda solution of 30 per cent. strength, a chromium solution prepared from 3.9 parts of $Cr_2O_3$, in the form of a freshly precipitated paste, and 16 parts of chloracetic acid. The whole is boiled in a reflux apparatus until all the parent dyestuff has disappeared. 55 parts of caustic soda solution of 30 per cent. strength and 2.5 parts of sugar are now added and, after boiling for 2 hours, the whole is made neutral by means of hydrochloric acid of 10 per cent. strength and evaporated to dryness in a vacuum. The chromium compound thus obtained dyes wool in an acid bath marine blue tints of very good fastness.

Example 8

41.6 parts of the azo-dyestuff from diazotized 1-amino-2-hydroxynaphthalene-4-sulfonic acid and β-naphthol are suspended in 800 parts of water, 13.3 parts of caustic soda solution of 30 per cent. strength and 19 parts of chromium formate, corresponding with 7.8 parts of $Cr_2O_3$, are added, and the whole is boiled in a reflux apparatus until all the parent dyestuff has disappeared. The mass is then made alkaline with 100 parts of caustic soda solution of 30 per cent. strength and, after addition of 5 parts of sugar, is heated to 85-90° C. for 2-3 hours. After filtering, the filtrate is made neutral with hydrochloric acid of 10 per cent. strength and the dyestuff is salted out. After drying, this chromium compound is a violet-black powder. It dyes wool in an acid bath marine blue tints of excellent fastness.

Example 9

41.6 parts of the azo-dyestuff from diazotized 1-amino-2-hydroxynaphthalene-4-sulfonic acid and β-naphthol are dissolved in 800 parts of water, with addition of 13.3 parts of caustic soda solution of 30 per cent. strength, and the solution is mixed with a chromium salt solution containing 7.8 parts of $Cr_2O_3$, 9.5 parts of crystallized oxalic acid and 9 parts of formic acid of 85 per cent. strength. The whole is then boiled in a reflux apparatus until all the parent dyestuff has entered into reaction. 5 parts of sugar and 110 parts of caustic soda solution of 30 per cent. strength are then added and the mixture is boiled for 3 hours on the water-bath. After neutralization with hydrochloric acid of 10 per cent. strength, the small quantity of precipitate is filtered and the filtrate is evaporated to dryness in a vacuum. The dyestuff dissolves in dilute alkalies to a blue solution and dyes wool in an acid bath marine blue tints of excellent fastness.

Example 10

20.8 parts of the dyestuff from diazotized 1-amino-2-hydroxynaphthalene-4-sulfonic acid and α-naphthol of the formula

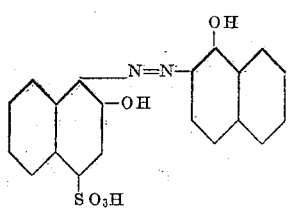

are dissolved in 400 parts of water with the aid of 6.6 parts of caustic soda solution of 30 per cent. strength. Chromium formate, corresponding with 8 parts of $Cr_2O_3$, is added and the whole is boiled in a reflux apparatus until the parent dyestuff has become a chromium compound. 55 parts of caustic soda solution of 30 per cent. strength are now added and the whole is boiled for 2-3 hours. It is then neutralized with hydrochloric acid of 10 per cent. strength, filtered from undissolved matter and the filtrate is evaporated to dryness in a vacuum. The product is a blue-black powder which dyes wool in an acid bath marine blue tints of very good fastness.

Example 11

39.4 parts of the azo-dyestuff from diazotized 1-amino-2-hydroxynaphthalene-4-sulfonic acid and β-naphthol are stirred into 700 parts of water, chromium formate, corresponding with 7.8 parts of $Cr_2O_3$, is added and the whole is boiled in a reflux apparatus until the parent dyestuff has disappeared, which is the case after about 1-2 hours. 110 parts of caustic soda solution of 30 per cent. strength are then added and boiling is continued for 2 hours, after which 5 parts of oxalic acid are added and as much hydrochloric acid of 10 per cent strength as is necessary for neutralization, and the whole is filtered, and the filtrate evaporated in a vacuum to dryness. The chromium compound obtained dyes wool in an acid bath marine blue tints of very good fastness.

Example 12

46.1 parts of the azo-dyestuff from nitrated 1-diazo-2-hydroxynaphthalene-4-sulfonic acid and β-naphthol of the formula

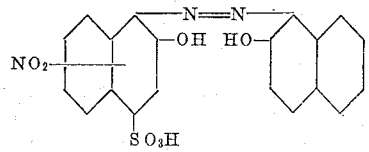

are suspended in 1000 parts of water and there are added 1 part of caustic soda solution of 30 per cent. strength, 6.8 parts of sodium formate and a chromium formate solution, corresponding with 8.36 parts of $Cr_2O_3$, and the whole is boiled in a reflux apparatus for 2½ hours. There are then added 110 parts of caustic soda solution of 30 per cent. strength and the mixture is boiled for 3 hours. After cooling to 50-60° C. the liquid is neutralized with hydrochloric acid of 10 per cent. strength, filtered from some suspended chromium hydroxide, made feebly acid to litmus with formic acid and evaporated in a vacuum to dryness.

The chromium compound thus obtained dissolves freely in water to a black-violet solution and dyes wool in a bath containing organic acid and sulfuric acid black tints of remarkable fastness.

Example 13

46.1 parts of the azo-dyestuff from nitrated 1-diazo-2-hydroxy-naphthalene-4-sulfonic acid and β-naphthol are stirred into 1500 parts of water and there are added a chromium fluoride solution corresponding with 24.5 parts of $Cr_2O_3$ and 100 parts of glass powder, and the whole is boiled for 1½ hours, while stirring well, in a reflux apparatus. The mass is then made alkaline by means of 180 parts of caustic soda solution of 30 per cent. strength and further boiled for 3 hours. The black-violet solution is now neutralized with hydrochloric acid of 10 per cent. strength at 50-60° C., filtered from glass powder and chromium hydroxide and the chromium compound is salted out, if necessary after concentration in a vacuum to about half the original volume.

The pressed and dried chromium compound dissolves freely in water to a black violet solution and dyes wool in a bath containing organic acid and sulfuric acid black tints of pronounced fastness.

Example 14

46.1 parts of the azo-dyestuff from nitrated 1-diazo-2-hydroxynaphthalene-4-sulfonic acid and β-naphthol are suspended in 1000 parts of water and mixed with a chromium fluoride solution, corresponding with 5.32 parts of $Cr_2O_3$, the whole being then boiled for 3 hours in a reflux apparatus. The mass thus obtained, which for the greater part consists of an insoluble chromium compound, is now dissolved in 80 parts of caustic soda solution of 30 per cent. strength and the solution is boiled for 3 hours. After cooling to 50-60° C. the liquid is made very feebly acid to litmus by means of hydrochloric acid of 10 per cent. strength and some formic acid, and, if necessary after filtration, is evaporated to dryness in a vacuum on the water-bath.

The chromium compound, which dissolves freely in water to a black-violet solution, dyes wool in a bath containing organic acid and sulfuric acid black tints of very good fastness.

Example 15

A dye-bath is prepared with 3 per cent. of sulfuric acid of 66° Bé. and 100 parts of wool are handled in this bath at 60° C. for 10-15 minutes. There are then added 6 parts of the thoroughly dissolved dyestuff of Example 1 and dyeing is continued for ½ hour at 60° C.; the bath is then gradually raised to the boil and a further 5 per cent. of sulphuric acid of 66° Bé. is added and boiling continued for ½ to ¾ hour for completely developing the shade. The wool is dyed marine-blue tints of excellent fastness.

*Example 16*

For 100 parts of ordinary silk 15 parts of the dyestuff of Example 12 are dissolved at the boil in the necessary quantity of water. This solution and 6-8 parts of acetic acid are added to the dye-bath, the goods to be dyed are entered at 50-60° C. and the bath is gradually heated to 80° C. and kept at this temperature for ¾ to 1 hour. The goods are then washed in the usual manner, brightened and dried. The silk is dyed full black tints of excellent fastness.

What we claim is:—

1. A manufacture of chromiferous azo-dyestuffs which comprises reacting in a medium whose pH-value is not greater than 7, azo-dyestuffs of the general formula

wherein $R_1$ means a sulfonated naphthalene radicle and $R_2$ a naphthol radicle, and wherein the hydroxyl group of the naphthalene radical $R_1$ stands in o-position to the azo-bridge, with agents yielding chromium, making said medium alkaline, and then completing the chroming without separating the chromiferous intermediate products.

2. A manufacture of chromiferous azo-dyestuffs which comprises reacting in a medium whose pH-value is not greater than 7, azo-dyestuffs of the general formula

wherein $R_1$ means a sulfonated naphthalene radicle and $R_2$ an unsubstituted naphthol radicle, and wherein the hydroxyl group of the naphthalene radical $R_1$ stands in o-position to the azo-bridge, with agents yielding chromium, making said medium alkaline, and then completing the chroming without separating the chromiferous intermediate products.

3. A manufacture of chromiferous azo-dyestuffs which comprises reacting in a medium whose pH-value is not greater than 7, azo-dyestuffs of the general formula

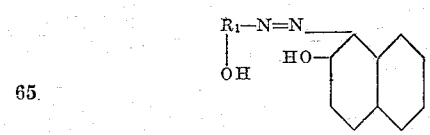

wherein $R_1$ means a sulfonated naphthalene radicle and wherein the two hydroxyl groups stand in o-position to the azo-bridge, with agents yielding chromium, making said medium alkaline, and then completing the chroming without separating the chromiferous intermediate products.

4. A manufacture of chromiferous azo-dyestuffs which comprises reacting in an acid medium azo-dyestuffs of the general formula

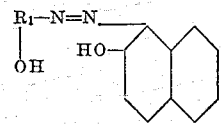

wherein $R_1$ means a sulfonated naphthalene radicle and wherein the two hydroxyl groups stand in o-position to the azo-bridge, with agents yielding chromium, making said medium alkaline, and then completing the chroming without separating the chromiferous intermediate products.

5. A manufacture of chromiferous azo-dyestuffs which comprises reacting in an acid medium azo-dyestuffs of the general formula

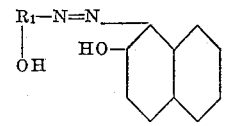

wherein $R_1$ means a sulfonated naphthalene radicle and wherein the two hydroxyl groups stand in o-position to the azo-bridge, with agents yielding chromium, making said medium alkaline by the addition of a caustic alkali, and then completing the chroming without separating the chromiferous intermediate products.

6. A manufacture of a chromiferous azo-dyestuff which comprises reacting in an acid medium an azo-dyestuff of the formula

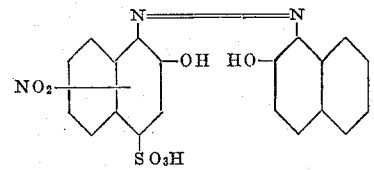

with agents yielding chromium, making said medium alkaline by the addition of a caustic alkali, and then completing the chroming without separating a chromiferous intermediate product.

7. A manufacture of a chromiferous azo-dyestuff which comprises reacting in an acid medium an azo-dyestuff of the formula

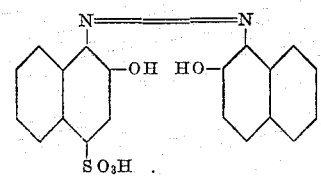

with agents yielding chromium, making said medium alkaline by the addition of a caustic alkali, and then completing the chroming without separating a chromiferous intermediate product.

8. Chromiferous azo-dyestuffs obtained by reacting in a medium whose pH-value is not greater than 7, azo-dyestuffs of the general formula

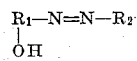

wherein $R_1$ means a sulfonated naphthalene radicle and $R_2$ a naphthol radicle, and wherein the hydroxyl group of the naphthalene radical $R_1$ stands in o-position to the azo-bridge, with agents yielding chromium, making said medium alkaline, and completing the chroming without separating the chromiferous intermediate products, which products represent violet-black to blue-black powders easily soluble in water, and dye wool in the acid bath very fast blue to black tints which are particularly fast to rubbing.

9. Chromiferous azo-dyestuffs obtained by reacting in a medium whose pH-value is not greater than 7, azo-dyestuffs of the general formula

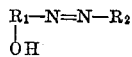

wherein $R_1$ means a sulfonated naphthalene radicle and $R_2$ an unsubstituted naphthol radicle, and wherein the hydroxyl group of the naphthalene radical $R_1$ stands in o-position to the azo-bridge, with agents yielding chromium, making said medium alkaline, and completing the chroming without separating the chromiferous intermediate products, which products represent violet-black to blue-black powders easily soluble in water, and dye wool in the acid bath very fast blue to black tints which are particularly fast to rubbing.

10. Chromiferous azo-dyestuffs obtained by reacting in a medium whose pH-value is not greater than 7, azo-dyestuffs of the general formula

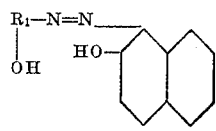

wherein $R_1$ means a sulfonated naphthalene radicle and wherein the two hydroxyl groups stand in o-position to the azo-bridge, with agents yielding chromium, making said medium alkaline, and completing the chroming without separating the chromiferous intermediate products, which products represent violet-black to blue-black powders easily soluble in water, and dye wool in the acid bath very fast blue to black tints which are particularly fast to rubbing.

11. Chromiferous azo-dyestuffs obtained by reacting in an acid medium azo-dyestuffs of the general formula

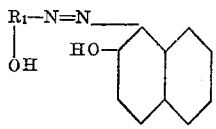

wherein $R_1$ means a sulfonated naphthalene radicle and wherein the two hydroxyl groups stand in o-position to the azo-bridge, with agents yielding chromium, making said medium alkaline, and completing the chroming without separating the chromiferous intermediate products, which products represent violet-black to blue-black powders easily soluble in water, and dye wool in the acid bath very fast blue to black tints which are particularly fast to rubbing.

12. Chromiferous azo-dyestuffs obtained by reacting in an acid medium azo-dyestuffs of the general formula

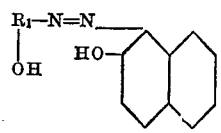

wherein $R_1$ means a sulfonated naphthalene radicle and wherein the two hydroxyl groups stand in o-position to the azo-bridge, with agents yielding chromium, making said medium alkaline by the addition of a caustic alkali, and completing the chroming without separating the chromiferous intermediate products, which products represent violet-black to blue-black powders easily soluble in water, and dye wool in the acid bath very fast blue to black tints which are particularly fast to rubbing.

13. The chromiferous azo-dyestuff obtained by reacting in an acid medium the azo-dyestuff of the formula

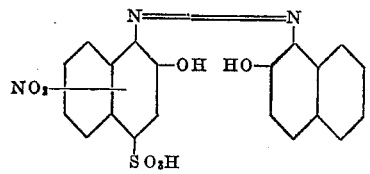

with agents yielding chromium, making said medium alkaline by the addition of a caustic alkali, and completing the chroming without separating a chromiferous intermediate product, which product represents a violet-black powder easily soluble in water and dyes wool in the acid bath very fast black tints which are particularly fast to rubbing.

14. The chromiferous azo-dyestuff obtained by reacting in an acid medium the azo-dyestuff of the formula

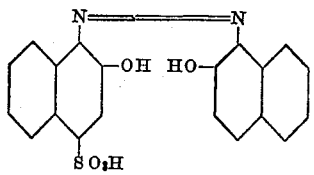

with agents yielding chromium, making said medium alkaline by the addition of a caustic alkali, and completing the chroming without separating a chromiferous intermediate product, which product represents a blue-black powder easily soluble in water and dyes wool in the acid bath very fast blue tints which are particularly fast to rubbing.

FRITZ STRAUB.
HERMANN SCHNEIDER.